United States Patent [19]

Kido

[11] Patent Number: 4,768,112
[45] Date of Patent: Aug. 30, 1988

[54] INTERLOCKED REVERSE MODE CHANGE-OVER MECHANISM FOR DUAL CASSETTE TAPE RECORDER

[75] Inventor: Kunio Kido, Wako, Japan

[73] Assignee: Tanashin Denki Co., Ltd., Tokyo, Japan

[21] Appl. No.: 937,487

[22] Filed: Dec. 3, 1986

[30] Foreign Application Priority Data

Jun. 30, 1986 [JP] Japan .......................... 61-100410[U]

[51] Int. Cl.$^4$ ............................................. G11B 15/18
[52] U.S. Cl. .................................... 360/69; 360/74.1; 360/91; 360/96.3
[58] Field of Search ....................... 360/69, 91, 92, 93, 360/74.1, 96.1, 96.3, 137

[56] References Cited

U.S. PATENT DOCUMENTS 3,560,666  2/1971  Bookman .......................... 360/92 X
4,262,314  4/1981  Smith et al. ............................ 360/69
4,309,729  1/1982  Kice .................................... 360/72.1

Primary Examiner—John H. Wolff
Attorney, Agent, or Firm—Wegner & Bretschneider

[57] ABSTRACT

A tape recorder device of the double cassette type wherein reproducing operation on a second tape driving mechanism can be automatically started continuously after completion of reproducing operation on a first tape driving mechanism and which is greatly improved in operability and allows operation of operating members by a low operating force. In the device, a selectively engageable member for selectively engaging with part of a reversing mechanism of a first tape driving mechanism to directly change over the reversing mechanism between a repetitive reversing condition and a one-time reversing condition is changed over to the one-time reversing condition in response to movement of a change-over operating member which brings a second tape driving mechanism into a pause condition.

2 Claims, 5 Drawing Sheets

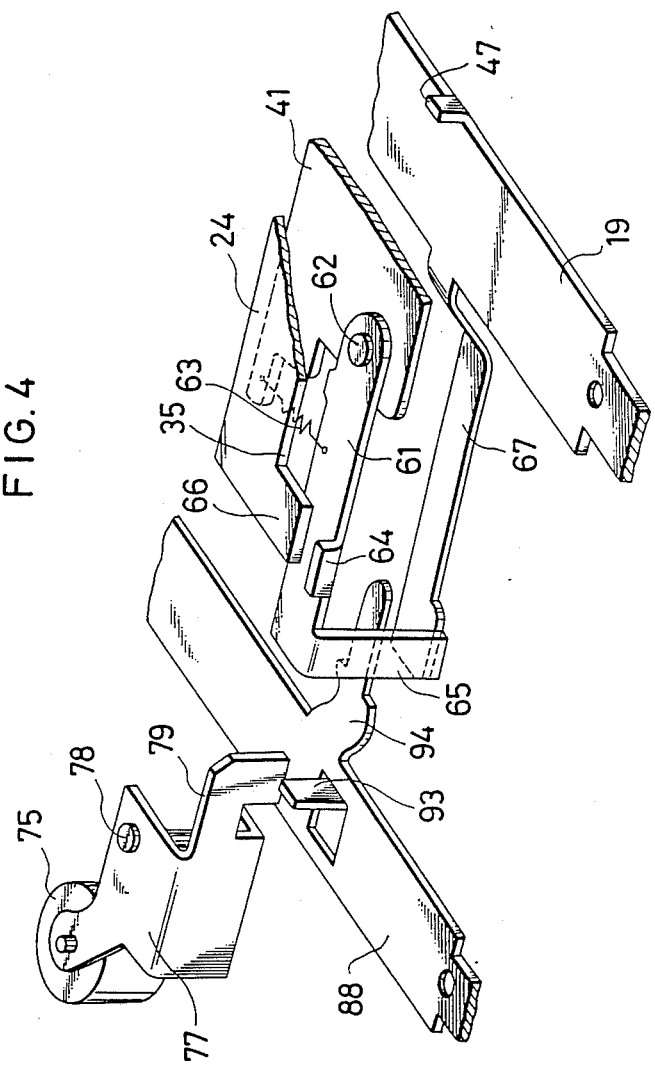

INTERLOCKED REVERSE MODE CHANGE-OVER MECHANISM FOR DUAL CASSETTE TAPE RECORDER

BACKGROUND OF THE INVENTION

1. Field of the Invention

This invention relates to a tape recorder device, and more particularly to a tape recorder device of the double cassette type wherein reproducing operation by a second tape driving mechanism can be automatically started continuously after completion of reproducing operation by a first tape driving mechanism.

2. Description of the Prior Art

A tape recorder device of the double cassette type is already known wherein reproducing operation by a second tape driving mechanism can be automatically started continuously after completion of reproducing operation by a first tape driving mechanism. In a tape recorder device of the type, normally a first tape driving mechanism includes an automatic reversing mechanism and a mode selection operating member by means of which a mode can be selected in which the automatic reversing mechanism selectively operates only once, that is, the first tape driving mechanism is stopped after reproduction of opposite A and B surfaces of a tape while a second tape driving mechanism includes a pause selection operating member which holds the second tape driving mechanism to a reproducing operation stand-by position and causes the same to start its reproducing operation in response to stopping of the first tape driving mechanism.

However, a tape recorder device of the type having such a construction as described above has a following problem. In particular, when continuous reproducing operation is to be effected using first and second tape driving mechanisms, it is necessary to operate a total of 4 operating members including a reproduction operating member and a mode selection operating member of the first tape driving mechanism and a pause selection operating member and a reproduction operating member of the second tape driving mechanism. It is troublesome to operate the four operating members in this manner, and particularly operation of the mode selection operating member is apt to be forgotten. Thus, the conventional tape recorder device is not easy to use.

In this manner, the conventional tape recorder device has a drawback that operation thereof is complicated and may readily be in error when continuous reproduction is to be effected using both the first and second tape driving mechanisms.

Therefore, it may be advisable, considering that a pause selection operating member must be operated without fail when a tape recorder is to be used in such a manner as described above, to constitute a tape recorder device such that a mode selection operating member is moved to an actuated position in response to operation of the pause selection operating member. However, if a tape recorder is constructed to achieve such operation, the operability of the pause selection operating member will be deteriorated and improvement in readiness in use cannot be expected because a load of the mode selection operating member is applied to the pause selection operating member.

SUMMARY OF THE INVENTION

It is an object of the present invention to provide a tape recorder device of the double cassette type wherein reproducing operation on a second tape driving mechanism can be automatically started continuously after completion of reproducing operation on a first tape driving mechanism and which is greatly improved in operability and allows operation of operating members by a low operating force.

In order to attain the object, according to the present invention, there is provided a tape recorder device, comprising a first tape driving mechanism having at least a reproducing function and normally capable of performing reproducing operation in a repetitive reversing mode, a second tape driving mechanism having at least a reproducing function, a first reproduction operating member for bringing said first tape driving mechanism into a reproduction operating condition, a second reproduction operating member for bringing said second tape driving mechanism into a reproduction operating condition, first arresting means for arresting said first reproduction operating member to its actuated position, second arresting means for arresting said second reproduction operating member to its actuated position, a reciprocally movable member mounted for back and forth reciprocal movement and operable to move back or forth when a tape comes to its end during reproducing operation of said first tape driving mechanism, a selectively engageable member having a disengaging position to which said selectively engageable member is normally held and in which said selectively engageable member cuts an interlocking relationship between said reciprocally movable member and said first arresting means and an engaging position in which said selectively engageable member allows the interlocking relationship between said reciprocally movable member and said first arresting means and transmits movement of said reciprocally movable member to said first arresting means to release the arrested condition of said first reproduction operating member by said first arresting means, a change-over operating member for bringing said second tape driving mechanism into a pause condition and simultaneously moving said selectively engageable member to the engaging position, and third arresting means operable for arresting said change-over operating member to its actuated position and for releasing said change-over operating member from its arrested condition to allow said change-over operating member to return to its non-actuated position in response to returning movement of said first reproduction operating member from its actuated to its non-actuated position.

Accordingly, if the change-over operating member is brought to its actuated, arrested position while the reproduction operating member of the first tape driving mechanism is arrested to its actuated position irrespective of presence or absence of a mode selection operating member, the selectively engageable member is changed over to the one-time reversing side. Since an operation to bring the second tape driving mechanism into a pause condition is essentially required when continuous reproducing operation is to be performed using the first and second tape driving mechanisms, even if operation of a mode selection operating member is forgotten or even if a specific member for mode selecting operation is not provided in the tape recorder device, continuous reproduction can be performed smoothly. Even where a specific mode selection operating member is provided, since only the selectively engageable member is actuated to change over by the change-over operating member, a load of the mode selection operating member is not at all applied to the change-over operating member and hence a high operating force is not required for operation of the change-over operating member.

The above and other objects, features and advantages of the present invention will become apparent from the following description and the appended claims, taken in conjunction with the accompanying drawing.

BRIEF DESCRIPTION OF THE DRAWINGS

FIG. 4 is a perspective view, in a somewhat enlarged scale, of a change-over mechanism for changing over the device from a repetitive reversing condition to a one-time reversing condition;

DESCRIPTION OF THE PREFERRED EMBODIMENTS

Now, preferred embodiments of the present invention will be described with reference to the accompanying drawings.

Figure 1:
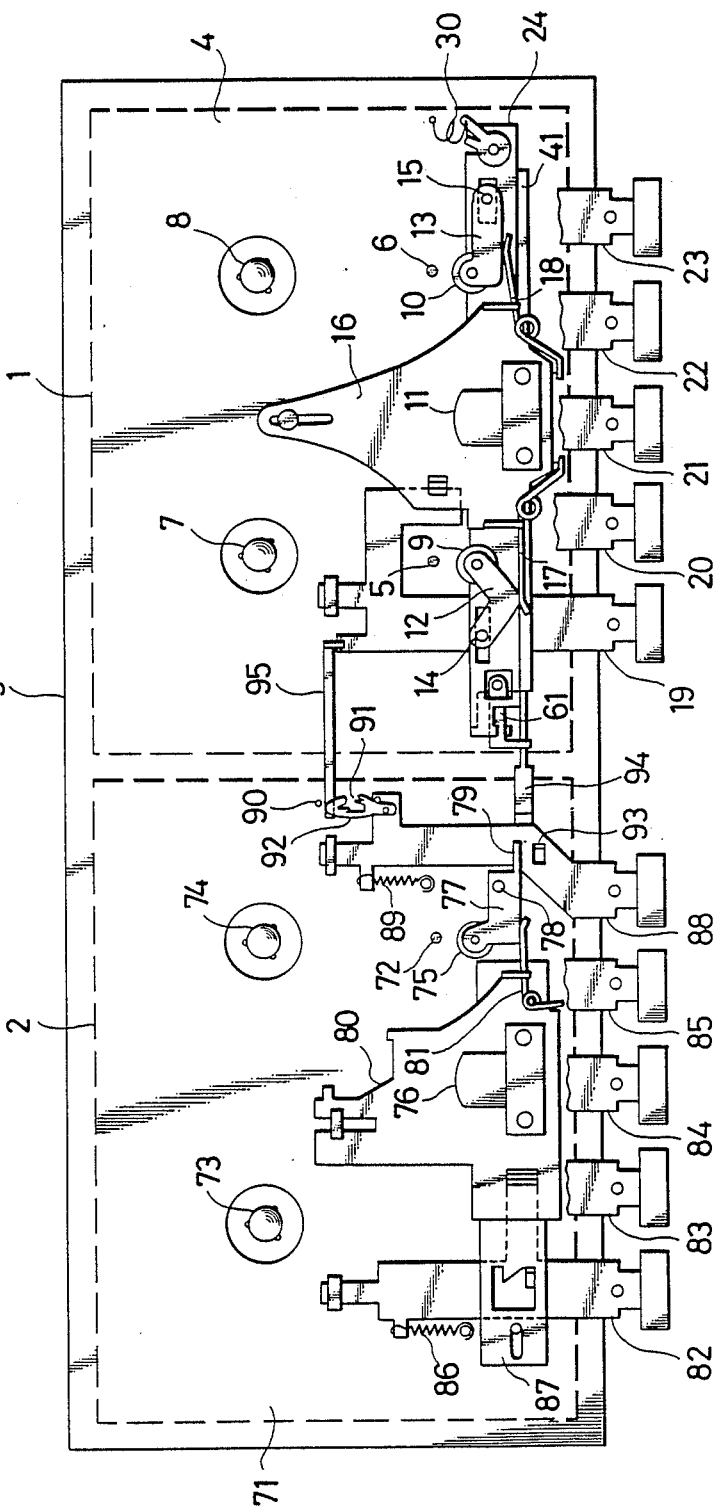
FIG. 1 is a plan view of a tape recorder device according to an embodiment of the present invention.

Referring first to FIG. 1, there is shown a tape recorder device according to an embodiment of the present invention. In the embodiment, the present invention is applied to a tape recorder which includes in combination a first tape driving mechanism on which recording, reproduction and dubbing can be achieved and which normally effects an automatic reversing operation and a second tape driving mechanism which is constructed only for reproduction and is automatically stopped by an end of a tape.

The first tape driving mechanism is generally denoted at 1 and the second tape driving mechanism is generally denoted at 2. The first and second tape driving mechanisms 1, 2 are mounted commonly on a base plate 3. It is to be noted, however, that the common base plate 3 may be otherwise replaced by a pair of base plates 4, 71 (shown in dashed lines) for the first and second tape driving mechanisms 1, 2, respectively, which are connected to each other either directly or indirectly by way of a connecting member.

The first driving mechanism 1 includes a pair of capstan shafts 5, 6 and a pair of reel shafts 7, 8 all mounted on the base plate 4 and connected to be driven to rotate by a motor not shown. The first driving mechanism 1 further includes a pair of pinch rollers 9, 10 and a magnetic head 11. The pinch rollers 9, 10 are supported for rotation on one end portions of a pair of pinch arms 12, 13 which have the other end portions supported for pivotal motion on arm shafts 14, 15 erected on the base plate 4, respectively. The magnetic head 11 is secured to a head supporting plate 16 mounted for back and forth movement on the base plate 4. A pair of spring rods 17, 18 have one end portions thereof supported on the head supporting plate 16 so that a pressing force may be applied from the opposite ends of the spring rods 17, 18 to urge the pinch arms 12, 13 toward the capstan shafts 5, 6, respectively, when the head supporting plate 16 is advanced. The first driving mechanism 1 further includes, as listed from the left side of FIG. 1, a reproduction operating member 19, a rewinding operating member 20, a fast feeding operating member 21, a stopping operating member 22 and a recording operating member 23 all mounted for back and forth movement in upward and downward directions in FIG. 1 and urged downwardly in FIG. 1 toward and held to respective positions shown in FIG. 1 by respective springs not shown.

Figure 2:
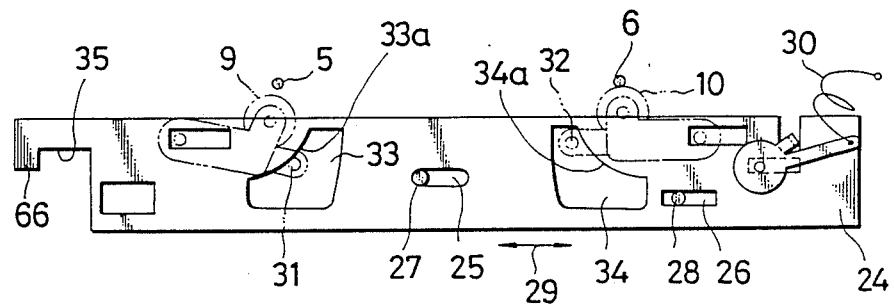
FIG. 2 is a plan view, in a somewhat enlarged scale, showing a reciprocally movable plate of an automatic reversing mechanism.

A reciprocally movable plate 24 is located below the pinch arms 12, 13 and the head supporting plate 16 and is moved rightwardly or leftwardly in response to a detecting operation of a tape end detecting mechanism not shown. Referring also to FIG. 2, the reciprocally movable plate 24 is movable only in a direction indicated by a double-headed arrow mark 29 under the guidance of a pair of elongated holes 25, 26 cooperating with a pair of pins 27, 28, and if a driving force is applied thereto from the tape end detecting mechanism, it is quickly moved rightwardly or leftwardly and thereafter held to its moved position by an action of a toggle spring connecting mechanism 30. The reciprocally movable plate 24 has a pair of holes 33, 34 formed therein, and a pair of pins 31, 32 projectingly mounted on lower surfaces of the pinch arms 12, 13 extend through the holes 33, 34, respectively. The holes 33, 34 of the reciprocally movable plate 24 are partly defined by inclined curved surfaces 33a, 34a one of which is alternatively engaged, when the reciprocally movable plate 24 is moved leftwardly or rightwardly while the head supporting plate 16 is in its advanced position, with the pin 31 or 32 to move the pinch roller 9 or 10 away from the capstan shaft 5 or 6. In the position shown in FIG. 2, the reciprocally movable plate 24 is in a rightwardly moved position and thus the pinch roller 10 is held in contact with the capstan shaft 6 while the pinch roller 9 is held away from the capstan shaft 5. It is to be noted that, in the position shown in FIG. 2, a tape is controlled to move in a rightward direction. On the contrary, if the reciprocally movable plate 24 is in its leftwardly moved position, the pinch roller 9 is contacted with the capstan shaft 5 with a tape held therebetween, and thus the tape is controlled to move in a leftward direction. The reciprocally movable plate 24 has a recess 35 formed adjacent a left end portion thereof.

Figure 3:
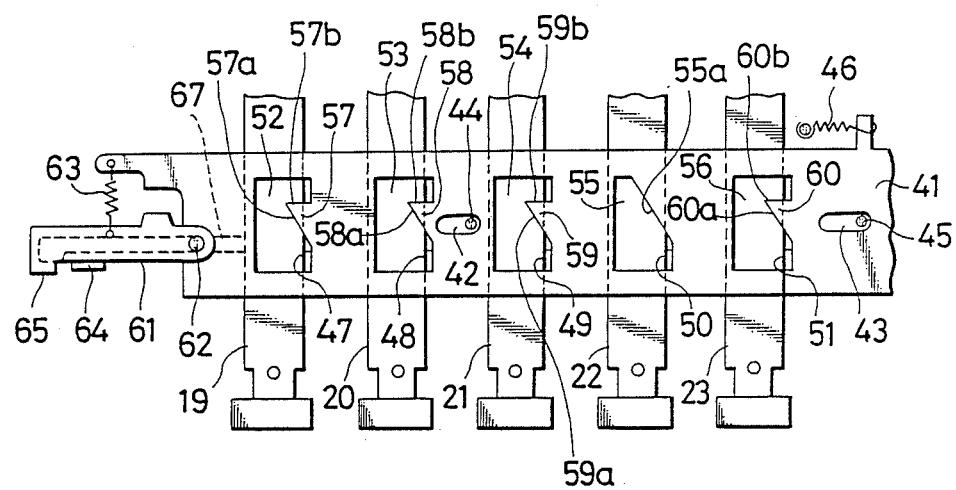
FIG. 3 is a plan view of a locking operating plate for arresting individual operating members.

Referring now to FIG. 3, located below the reciprocally movable plate 24 is a locking operating plate 41 acting as a first arresting means for selectively arresting the operating members 19, 20, 21, 23 except the stopping operating plate 22 to respective pushed in positions. The locking operating plate 41 is movable only in a leftward and rightward direction in FIG. 3 under the guidance of a pair of elongated holes 42, 43 cooperating with pins 44, 45, respectively, and is urged in a leftward direction in FIG. 3 by means of a spring 46. The locking operating plate 41 has holes 52, 53, 54, 55, 56 formed at positions thereof opposing to the operating members 19, 20, 21, 22, 23, and projections 47, 48, 49, 50, 51 formed on the operating members 19, 20, 21, 22, 23 extend through the holes 52, 53, 54, 55, 56, respectively, of the locking operating plate 41. The locking operating plate 41 has hooks 57, 58, 59, 60 formed to extend into the holes 52, 53, 54, 56 thereof. The hooks 57, 58, 59, 60 have inclined camming surfaces 57a, 58a, 59a, 60a for slidably engaging with the projections 47, 48, 49, 51 of the operating members 19, 20, 21, 23 to move the locking operating plate 41 rightwardly, and arresting surfaces 57b, 58b, 59b, 60b for arresting the operating members 19, 20, 21, 23 to their pushed in or actuated positions, respectively. Thus, if, for example, the reproduction operating member 19, is pushed in, the projection 47 thereof first slides along the inclined camming edge 57a to move the locking operating plate 41 rightwardly and then clears the hook 57 to allow the locking operating plate 41 to be returned to its home position by the spring 46. Accordingly, as the reproduction operating member 19 is released, the projection 47 thereof is engaged with the arresting surface 57b of the hook 57 of the locking operating plate 41 to arrest the locking operating plate 41 to its actuated position. If one of the other operating members 20, 21, 23 is pushed in, it will be arrested to its actuated position in a similar manner. It is to be noted here that no hook is formed to extend into the hole 55 of the locking actuating plate 41 opposing to the stopping operating member 22 and the hole 55 is partly defined by an inclined camming surface 55a. Accordingly, if the stopping operating member 22 is pushed in to its actuated position, it will not be arrested to its actuated position. It is also to be noted that as the reproduction operating member 19 is pushed in to its actuated position, the head supporting plate 16 is advanced thereby to its advanced position in which the magnetic head 11 is slidably contacted with a surface of a tape. If the stopping operating member 22 is pushed in while any one of the remaining operating members 19, 20, 21, 23, for example, the reproduction operating member 19, is arrested in its actuated position, the locking operating plate 41 is moved rightwardly by camming engagement of the inclined camming surface 55a thereof by the projection 50 of the stopping operating member 22 whereupon the reproduction operating member 19 is released from its actuated position and allowed to return to its home position. A selectively engageable member 61 is supported for pivotal motion at a left end portion of the locking operating plate 41 by means of a pin 62 and is urged in a counterclockwise direction by a spring 63 extending thereto from the left end of the locking operating plate 41.

FIG. 4 illustrates relations among the selectively engageable member 61, a left end portion of the locking operating plate 41, a left end portion of the reciprocally movable plate 24 and the reproduction operating member 19. The selectively engageable member 61 has an upwardly bent engaging lug 64 and a downwardly bent engaging piece 65 formed thereon. The engaging lug 64 of the selectively engageable member 61 opposes, when the reciprocally movable plate 24 is in its rightwardly moved position (FIG. 4), to a portion 66 of the reciprocally movable plate 24 which extends in a direction opposite to the pushing in direction of the operating members 19 to 23 from the left end of the reciprocally movable plate 24 and defines the recess 35, but when the reciprocally movable plate 24 is in its leftwardly returned position, the engaging lug 64 opposes to the recess 35 of the reciprocally movable plate 24. The reproduction operating member 19 has an arm 67 positioned to engage with the engaging piece 65 of the selectively engageable member 61 to prevent pivotal motion of the selectively engageable member 61 toward the reciprocally movable plate 24 when the reproduction operating member 19 is not in its actuated or pushed in position.

Referring again to FIG. 1, the second tape driving mechanism 2 includes a capstan shaft 72 and a pair of reel shafts 73, 74 all mounted on the base plate 71 and connected to be driven to rotate by the motor. The second tape driving mechanism 2 further includes a pinch roller 75 and a magnetic head 76. The pinch roller 75 is supported for rotation at an end portion of a pinch arm 77 which is supported for pivotal motion on an arm shaft 78 erected on the base plate 71. A pressing piece 79 is provided in an integral relationship at the other end of the pinch arm 77. The magnetic head 76 is secured to a head supporting plate 80 mounted for back and forth movement on the base plate 71. An end portion of a spring rod 81 bears against the head supporting plate 80 so that a pressing force toward the capstan shaft 72 may be applied to the pinch arm 77 by the other end portion of the spring rod 81 when the head supporting plate 80 is advanced. The second tape driving mechanism 2 further includes, as listed from the left side in FIG. 1, a reproduction operating member 82, a rewinding operating member 83, a fast feeding operating member 84 and a stopping operating member 85 which are mounted for back and forth movement in upward and downward directions in FIG. 1 and are urged downwardly in FIG. 1 toward and normally held to respective home positions as shown in FIG. 1 by respective springs (only a spring 86 for the reproduction operating member 82 is shown in FIG. 1). The operating members 82, 83, 84 are selectively locked or arrested to their respective actuated positions by a locking operating plate 87 acting as a second arresting means which is similar to the locking operating plate 41 for the first tape driving mechanism 1 described above.

A change-over operating plate member 88 is also mounted for back and forth movement in upward and downward directions in FIG. 1 on the right side of the stopping operating member 85 and is normally urged downwardly in FIG. 1 toward and held to a position as shown in FIG. 1 by a spring 89. The change-over operating member 88 has a hook 92 mounted at an end portion thereof. The hook 92 of the change-over operating member 88 cooperates with a pin 90 erected on the base plate 71 such that when the change-over operating member 88 is pushed in for the first time, the hook 92 thereof is arrested by the pin 90 to hold the change-over member 88 to its pushed in or actuated position and then when the change-over operating member 88 is pushed in for the second time, the hook 92 thereof is released from the pin 90 to allow the change-over operating member 88 to be returned to its home position by the urging of the spring 89. Thus, the hook 92 of the change-over operating member 88 and the pin 90 constitute a third arresting means 91. The change-over operating member 88 further has a projection 93 formed thereon for pressing against the pressing piece 79 of the pinch arm 77 to pivot the pinch arm 77 in a direction to displace the pinch roller 75 away from the capstan shaft 72 when the change-over operating member 88 is pushed in until it is arrested to its actuated position by the third arresting means 91. The change-over operating member 88 additionally has an arm 94 which prevents pivotal motion of the selectively engageable member 61 in a similar manner to the arm 67 of the reproduction operating member 19 when the change-over operating member 88 is in its home position as shown in FIG. 4.

Figure 5A:
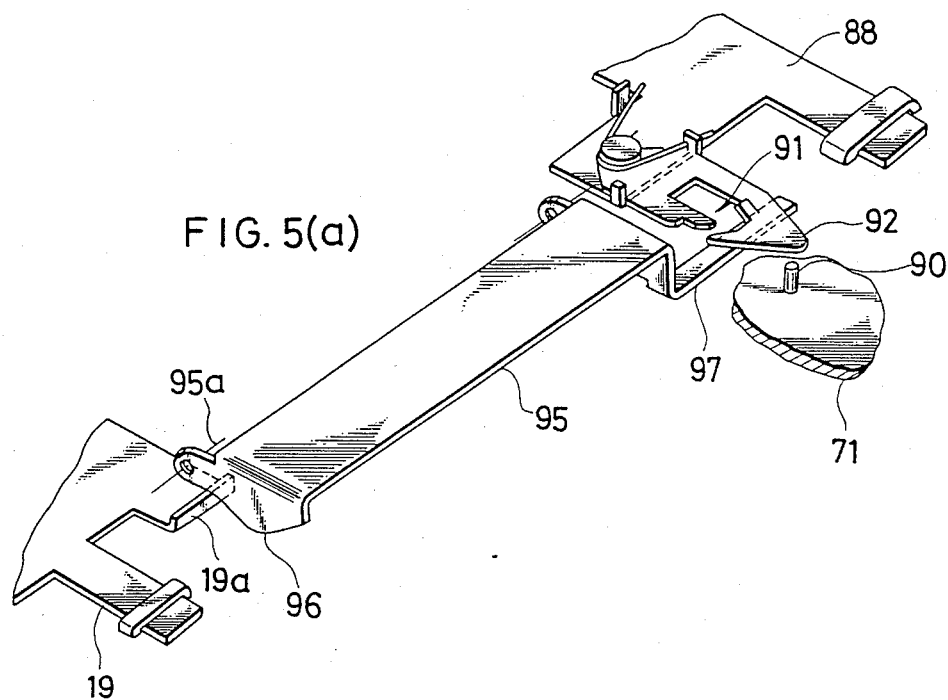
FIGS. 5(a) to 5(c) show relations of a release member to associated parts, and FIG. 5(a) being a rear perspective view, FIG. 5(b) being a side elevational view, and FIG. 5(c) being a side elevational, vertical sectional view of the release member.
Figure 5B:
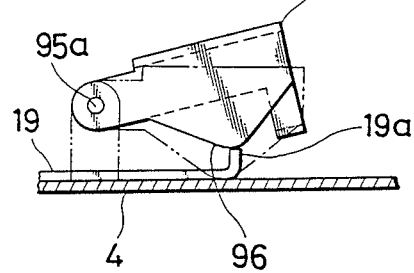
Figure 5C:
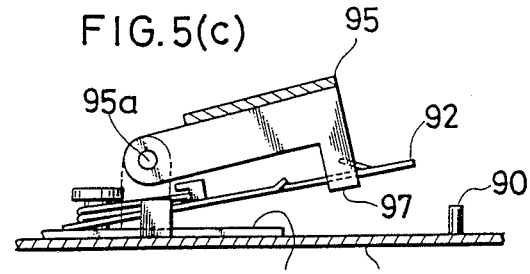

A release member 95 is located between an engaging bent lug 19a at an end of the reproduction operating member 19 of the first tape driving mechanism 1 and the hook 92 of the change-over operating member 88 for releasing the arrested condition of the change-over operating member 88 by the hook 92 and the pin 90 when the reproduction operating member 19 is moved in its returning direction. The release member 95 is in the form of a bail and is supported at opposite ends thereof for pivotal motion around an axis 95a by the first tape driving mechanism 1 and the second tape driving mechanism 2 as shown in FIG. 5(a). The release member 95 has at an end portion thereof adjacent the first tape driving mechanism 1 a downwardly convexed cam face or edge 96 for sliding engagement with the engaging bent lug 19a of the reproduction operating member 19 and at the other end portion thereof adjacent the second tape driving mechanism 2 an extension 97 which underlies the hook 92 of the change-over operating member 88. Thus, when the reproduction operating member 19 is pushed in from its home position and also when it is returned to its home position, the engaging bent lug 19a thereof is slidably engaged with the cam face 96 of the release member 95 to pivot the release member 95 counterclockwise around its axis 95a as seen in FIG. 5(b). Thereupon, the extension 97 of the release member 95 acts to tilt or lift a free end of the hook 92 as seen in FIG. 5(c). Accordingly, if the hook 92 has been held arrested by the pin 90, it is released from the latter as the release member 95 is pivoted. Consequently, the change-over operating member 88 is released from its arrested condition and hence will be returned to its unactuated home position by the spring 89.

With the construction described above, recording, reproduction, fast feeding and rewinding of a tape can be effected by selectively operating the operating members using the first tape driving mechanism 1. Reproduction can also be effected using the second tape driving mechanism 2. Further, dubbing can be effected using the first and second tape driving mechanisms 1, 2.

While reproduction is being effected using only the first tape driving mechanism 1, unless the changeover operating member 88 is pushed in, the feeding direction of a tape is automatically changed over each time the tape comes to its end, that is, repetitive reversing operation is performed. Meanwhile, continuous reproduction using the first and second tape driving mechanisms 1, 2 will be conducted as follows.

At first, two tape cassettes are loaded on the reel shafts 7, 8 of the first tape driving mechanism 1 and the reel shafts 73, 74 of the second tape driving mechanism 2. Then, the reproduction operating member 19 of the first tape driving mechanism 1 is pushed in, and then the change-over operating member 88 and the reproduction operating member 82 of the second tape driving mechanism 2 are pushed in in succession. In response to such pushing in operation of the reproduction operating member 19, reproduction of the tape loaded on the first tape driving mechanism 1 is started with its A surface. In this instance, on the side of the second tape driving mechanism 2, the pressing piece 79 of the pinch arm 77 is pressed by the projection 93 of the change-over operating member 88 to hold the pinch roller 75 to a reproduction stand-by or pause position in which it is spaced a little distance from the tape. Meanwhile, as the reproduction operating member 19 and the change-over operating member 88 are pushed in, the arms 67, 94 thereof no more prevent pivotal motion of the selectively engageable member 61. Consequently, the selectively engageable member 61 tries to pivot in the clockwise, pushing in direction of the operating members 19, 88 so that, when the reciprocally movable plate 24 is in its rightwardly moved position as shown in FIG. 4, it is stopped in a position in which the engaging lug 64 of the selectively engageable member 61 is abutted with the portion 66 of the reciprocally movable plate 24.

When reproduction of the A surface of the tape is completed and the tape comes to its end, the tape end detecting mechanism detects the tape end to cause the reciprocally movable plate 24 to slide leftwardly. As the reciprocally movable plate 24 is moved leftwardly in this manner, the portion 66 of the reciprocally movable plate 24 is brought out of abutting engagement with the engaging projection 64 of the selectively engageable member 61 so that the selectively engageable member 61 is allowed to be pivoted in the clockwise direction by the urging of the spring 63 with the engaging projection 64 thereof admitted in the recess 35 of the reciprocally movable plate 24. Meanwhile, reproduction of the surface B of the tape is started.

When reproduction of the surface B of the tape is completed and the tape comes to its end, the tape end detecting mechanism operates again so that the reciprocally movable plate 24 attempts to move rightwardly. However, since the engaging projection 64 of the selectively engageable member 61 is fitted in the recess 35 of the reciprocally movable plate 24 as described hereinabove, the reciprocally movable plate 24 and the selectively engageable member 61 are moved rightwardly in an integral relationship. Since the selectively engageable member 61 is connected to the locking operating member 41 via the pin 62, also the locking operating plate 41 is moved rightwardly. As a result, the projection 47 of the reproduction operating member 19 is released from the hook 57 of the locking operating member 41 so that the reproduction operating member 19 is returned to its home position. Thus, reproducing operation on the first tape driving mechanism 1 is ended at this point of time.

As the reproduction operating member 19 is returned to its home position, the releasing mechanism 95 releases the arrested condition of the change-over operating member 88 by the third arresting means 91. Consequently, the change-over operating member 88 is returned to its home position. As the change-over operating member 88 is thus returned, the pinch arm 77 is disengaged from the change-over operating member 88 and thus allowed to pivot clockwise in FIG. 1 to press the pinch roller 75 against the capstan shaft 72 via the tape to allow reproduction to be continuously performed on the second tape driving mechanism 2. Then, when the tape comes to its end, the arrested condition of the reproduction operating member 82 is released, and at this point of time, continuous reproduction is completed. It is to be noted that in case reproduction on the first tape driving mechanism 1 is started with the surface B of the tape, when the tape is fed in one direction and comes to its end, reproducing operation is succeeded by the second tape driving mechanism 2.

In this manner, the selectively engageable member 61 which directly changes over between the repetitive reversing condition and the one-time reversing condition of the first tape driving mechanism 1 is changed over to the one-time reversing condition in response to operation of the change-over operating member 88 which is operated without fail when continuous reproduction is to be effected using the first and second tape driving mechanisms 1, 2. Accordingly, when such continuous reproduction is desired, only three operating members must be operated. Thus, such reproduction can be effected by a reduced number of operations of operating members comparing with operations on conventional tape recorder devices, and hence the operability is improved. Besides, since the arrested condition from rotation of the selectively engageable member 61 is released by the change-over operating member 88 to change over the selectively engageable member 61 to the one-time reversing condition, a high force is not required for operation of the change-over operating member 88, which improves readiness in use of the tape recorder device.

Figure 6:
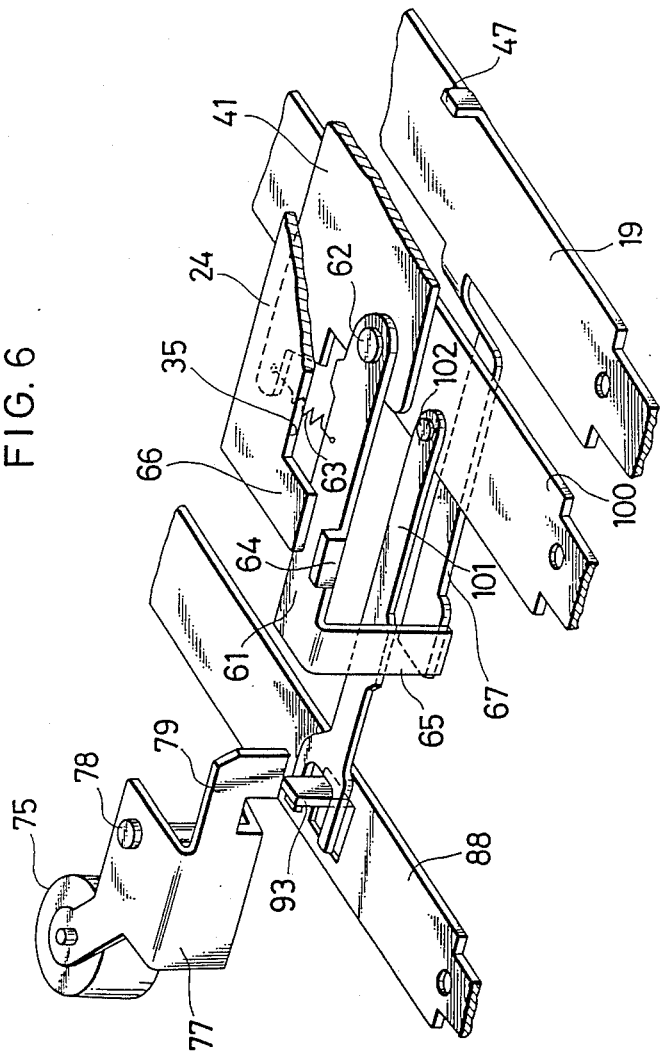
FIG. 6 is a similar view but illustrating a reversing condition change-over mechanism according to another embodiment of the invention.

It is to be noted that the present invention is not limited to the specific embodiment described hereinabove. For example, similar effects to those of the embodiment can be attained if, as shown in FIG. 6, an end portion of an arm 101 is pivotally connected to a mode selecting operating member 100 by a pin 102 while the other end of the arm 101 is bifurcated to receive a projection 93 of a change-over operating member 88 therein, whereby whether pivotal motion of a selectively engageable member 61 is prohibited or allowed is controlled by the arm 101. In this instance, only slight modification of an existing tape recorder device may be required in order to obtain a tape recorder device according to the present invention.

As apparent from the foregoing description, according to the present invention, a tape recorder device can be provided which is reduced in operations in error and is significantly improved in operability.

Having now fully described the invention, it will be apparent to one of ordinary skill in the art that many changes and modifications can be made thereto without departing from the spirit and scope of the invention as set forth herein.

What is claimed is:

1. A tape recorder device, comprising a first tape driving mechanism having at least a reproducing function and normally capable of performing reproducing operation in a repetitive reversing mode, a second tape driving mechanism having at least a reproducing function, a first reproduction operating member for bringing said first tape driving mechanism into a reproduction operating condition, a second reproduction operating member for bringing said second tape driving mechanism into a reproduction operating condition, first arresting means for arresting said first reproduction operating member to its actuated position, second arresting means for arresting said second reproduction operating member to its actuated position, a reciprocally movable member mounted for back and forth reciprocal movement and operable to move back or forth when a tape comes to its end during reproducing operation of said first tape driving mechanism, a selectively engageable member having a disengaging position to which said selectively engageable member is normally held and in which said selectively engageable member cuts an interlocking relationship between said reciprocally movable member and said first arresting means and an engaging position in which said selectively engageable member allows the interlocking relationship between said reciprocally movable member and said first arresting means and transmits movement of said reciprocally movable member to said first arresting means to release the arrested condition of said first reproduction operating member by said first arresting means, a change-over operating member for bringing said second tape driving mechanism into a pause condition and simultaneously moving said selectively engageable member to the engaging position, and third arresting means operable for arresting said change-over operating member to its actuated position and for releasing said change-over operating member from its arrested condition to allow said change-over operating member to return to its non-actuated position in response to returning movement of said first reproduction operating member from its actuated to its non-actuated position.

2. A tape recorder device according to claim 1, wherein said selectively engageable member is pivotally connected to said first arresting means.

* * * * *